Sept. 24, 1940.  E. A. RICHARDSON  2,215,532
METHOD AND APPARATUS RELATING TO INSULATED
VESSELS AND STRUCTURES OF GREAT VARIETY
Filed Feb. 20, 1935  3 Sheets-Sheet 1

INVENTOR
Edward Adams Richardson
BY
Prindle Bean & Mann
ATTORNEYS

Sept. 24, 1940.   E. A. RICHARDSON   2,215,532
METHOD AND APPARATUS RELATING TO INSULATED
VESSELS AND STRUCTURES OF GREAT VARIETY
Filed Feb. 20, 1935   3 Sheets-Sheet 2

INVENTOR
Edward Adams Richardson
BY
Prindle Bean & Mann
ATTORNEYS

Sept. 24, 1940.   E. A. RICHARDSON   2,215,532
METHOD AND APPARATUS RELATING TO INSULATED
VESSELS AND STRUCTURES OF GREAT VARIETY
Filed Feb. 20, 1935   3 Sheets-Sheet 3

INVENTOR
Edward Adams Richardson
BY
Prindle, Bean & Mann
ATTORNEYS

UNITED STATES PATENT OFFICE 2,215,532

METHOD AND APPARATUS RELATING TO INSULATED VESSELS AND STRUCTURES OF GREAT VARIETY

Edward Adams Richardson, Bethlehem, Pa.

Application February 20, 1935, Serial No. 7,582

6 Claims. (Cl. 23—1)

My invention relates to:

(A) Utilization of a layer of fluid in a vessel or structure for a region of thermal insulation, both in the case of fluid forming a part of the normal or useful contents of the vessel or structure and in that of a fluid specifically introduced for such thermal insulation.

(B) Causing said region to limit the flow of heat to a value somewhat greater, but of the order of that due to a purely conductive transfer of heat through said region.

(C) Securing this limitation on heat flow through said region by introducing therein a subdivided solid arranged to reduce radiation through said region to the order of, or materially less than the flow by pure conduction therein.

(D) Spacing these subdivided solid parts to limit heat transfer through the region to the order of, or materially less than the flow by pure conduction therein.

(E) Causing and maintaining a fluid drift through said subdivided region, in a direction substantially opposing heat flow at zero drift, whereby heat attempting to escape is recovered regeneratively by the drifting fluid and returned to the region of higher temperature.

(F) Apparatus thermally insulated by a subdivided fluid envelope.

(G) Apparatus thermally insulated or isolated by a fluid drift through a subdivided fluid envelope.

(H) Apparatus for fluid heating in which the fluid being regeneratively heated also serves to insulate the process.

(I) Apparatus for maintaining a region of high temperature at high pressure, in a fluid, utilizing the thermal properties of the fluid.

(J) Apparatus and methods for thermally insulating objects at a temperature level other than that of their surroundings.

My invention is intended for use with a great variety of structures and apparatus, such, for example, as walls, buildings, enclosures, heat exchange apparatus, vessels, pipes, conduits, flues, reaction chambers, furnaces, fluid heaters and evaporators. It is intended for use at high pressures or low, for cold process or hot, being adapted in fact to very high temperatures where ordinary refractory or insulating materials must give way to the material being processed. In general the insulation is located within the apparatus rather than without, though this is not true in all cases. For example, whereas it is normal to place insulation on the outside of a pipe, my insulation is particularly adapted to utilizing the fluid inside of the pipe for insulation and hence requires an interior location, yet it is possible to utilize air or other fluid for an insulating medium for said pipe in my insulation with fluid drift on the outside of the pipe.

Advantages of my invention are very numerous. Fluids may be utilized for self-insulation, insulating fluids may be utilized where the fluid available is too conductive, high temperature processes may be isolated from containing vessel walls at all pressures. Cool vessel walls avoid problems of metal "creep" and permit of high stresses; ordinary materials, and great savings in quantity of material in the containing vessel and the cost thereof. Hot bodies may be isolated for comfort of the surroundings, for economy in ventilation fluid, and for heat recovery from the ventilating fluid due to the geratly increased temperature rise and the reduced fluid quantity. Building walls may be made to save heat by recovering the wall loss regeneratively in air being drawn in for ventilation, or buildings may be cooled by a reverse process.

Other advantages are that fluids may be heated, using the method of fluid drift towards a source of heat, while said fluid insulates against the heat; a fluid region of materially elevated temperature under very high pressure may be produced and maintained, largely by purely thermal means and the properties of the fluid; very thin layers of insulation may be made to insulate completely against very high temperatures; corrosion protection may be secured as an incident to the insulation of a region against heat; opaque fluids may be utilized to advantage, particularly in high temperature insulation; molten metals may be utilized for at least a portion of the insulation; highly conductive fluids may be utilized, with a metal subdividing structure, for thermal insulation; fluids decomposing gradually at high temperatures may be utilized for self-insulation with little or no trouble from the decomposition products or solids. These are merely a few of the advantages obtainable through the application of my invention.

I am aware that heat insulation normally consists of a solid material of low conductivity, or a solid material of open or porous structure, or cellular in structure and largely gas-permeated. I am aware that layers of material with gas separation, and plates or cylinders of materials of great variety have been utilized as insulation. I am aware that brick-work has been used inside of reaction chambers, flues, and the like for insulation, though when in contact with liquids such material has normally been embedded in cement, or protected with tar or other material against fluid penetration. These means are quite common.

I am also aware that a molten salt subdivided with granular material has been applied to the walls of reaction chambers for insulation and that rings of solid material have been used in such molten salt in place of the granular material. A flow of gas or other fluid along the walls of catalytic cells under pressure has been used to cool the walls thereof while flowing substantially parallel to the walls and while being heated. A similar flow of cooling fluid has been used in pipes. I am also aware that corrosion has been avoided in certain special cases by flowing a fluid between a wall and a corrosive-containing fluid while separated therefrom by a permeable membrane.

My invention requires utilizing a fluid region, such as a fluid layer or a fluid envelope, for establishing thermal insulation between the faces or surfaces thereof, whereby the heat flow through the layer or the envelope is reduced. This fluid region is subdivided by solid material in subdivided form for two purposes, in general: first to reduce radiation through the region by establishing material barriers or the equivalent thereof in the path of the radiation, or by utilizing a subdivided solid in dispersion or suspension which, by its presence, confers opacity on the fluid, or by utilizing a fluid whose individual molecules confer on the fluid the effect of molecular subdivision, such, for example, as a liquid metal: and second to reduce heat transfer, by convection of the fluid in the region, through suitable spacing of the subdivided material so as to oppose resistance limiting the fluid currents. Known methods of thermal insulation utilize features such as these to a greater or less extent in the special examples which have been discovered heretofore.

My invention is distinguished as follows: Given an insulating region established as indicated in the preceding paragraph, we may erect at any point thereof a vector, applicable to any small area in the region, whose direction is the mean direction of the heat flow through the area and is normally defined as the normal to the surface of constant temperature, which includes the small area, at that area, and whose magnitude is proportional to the heat flow through unit area at the point or small area. The fluid in the customary insulating region is stationary excepting for convection currents therein, the flow of fluid through either surface of the layer, or over either surface of the envelope being zero. If, now, fluid is caused to drift through the fluid region so that the flow integral over the boundary surface is no longer zero, and particularly if this fluid flow occurs so that the fluid flow vector for any small area in the fluid substantially opposes the heat flow vector, above defined, at the same area, my invention operates. The flow of fluid through the insulating subdivided fluid layer against the heat trying to escape distinguishes my invention from the inventions of others. However, the velocity of flow may have any value, and I particularly include the special case of zero velocity in the case where I utilize fluid normal to the process, or a special fluid substituted in the region, for thermal insulation. It is important to note that both the heat flow and the fluid flow vectors are based on a "small area" in the region so as to permit of flow irregularities of the order of the fineness of the units of subdividing material, and to permit of a small degree of tortuous fluid and heat flow. But it is not my intent thereby to permit a considerable measure of flow parallel to the surface of the fluid layer or envelope, such as distinguishes fluid cooling of walls and enclosures for protection from high temperatures. My fluid flows by a direct path between surfaces, excepting for small excursions made necessary as noted.

I have classified my invention according to different forms it may take. Any form of insulation in which fluid drift through the region occurs is called A. For the special case in which the drift is zero, the class is B. It is to be particularly noted that complete thermal isolation may be secured with velocities of flow of the order of a fraction of an inch to a few inches per hour, so the velocities are very small where insulation only is required. Both of these classes are further subdivided by distinguishing between the utilization of the fluid normal to the region, classed as $a$, and the case in which the fluid normal to the region is replaced by another fluid isolated from that normal to the region, this class being distinguished as $b$. Hence we may have four types of insulation, to be later described, as $Aa$, $Ab$, $Ba$, and $Bb$.

My invention is little concerned with materials or their exact form, as materials of high or of low conductivity may be utilized in various applications, fluids of low or high conductivity may be utilized, including liquid metals, and pulverulent, granular, fibrous, or cellular material; thin plates or cylinders; porous solids; blocks with small spaces between; and a wide variety of other forms of subdividing body may be utilized. Later I shall consider two important cases—viz. (1) granular material, and (2) a number of thin plates—in deriving the conditions to be met in subdividing the fluid region, for these represent two extremes and serve to illustrate my methods. Pulverulent material permits of convection currents ranging throughout the thickness of the region, while parallel plates in general limit convection to the film between adjacent plates.

The apparatus I shall describe as part of my invention utilize one or more of these forms of insulation, or secure new effects from such use which are valuable in themselves.

I attain my objects by methods and with apparatus illustrated in the accompanying drawings, by means of which I shall distinguish what is new and part of my invention from what is old, in which—

Figs. 2 to 7, both inclusive, show in cross-section, normally vertical for Figs. 2, 3, 5 and 7, the four classes of heat insulation previously defined, in which Figs. 8, 9 and 10 show alternative details, normally in vertical cross-section, of which Fig. 8 shows a method of zoning a fluid vertically as in the case when the fluid is partially liquid and partially vapor in the subdivided region; Fig. 9 shows the use of blocks as subdividing body, with thin fluid films between; Fig. 10 shows the combination of Ba type insulation for protecting the wall and Aa type insulation between the channel and the normal fluid, preheated fluid being introduced through the channel to conserve heat.

Figs. 11, 12, 13 and 14 illustrate apparatus forms, all in normally vertical cross-section, Fig. 11 showing the method and one form of construction for isolating a hot body such as a furnace or a flue; Fig. 12 shows a reaction chamber for high pressures and temperatures—in which type Ab insulation in pressure balance with the vessel normal contents is utilized for the main part of the reaction chamber, while type Aa insulation is utilized for the passage—together with a possible form of pressure-balancing apparatus and means for producing the fluid drift.

Similar numerals refer to similar parts throughout the several views.

Figure 1:
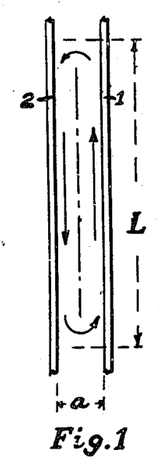
Fig. 1 shows diagrammatically in cross-section, normally vertical, two plates of a subdividing body with the convection current therebetween.

In Fig. 1, a radiation subdividing partition 1 at higher temperature, at distance a therefrom a substantially parallel partition 2 of lower temperature, a fluid eddy therebetween of length L, the right half between 1 and the dashed line rising, the left half descending, whereby heat is carried by convection between 1 and 2. A thin fluid stream has an equivalent pipe diameter of twice its thickness, hence such diameter, D later referred to, equals a. Circulation occurs by difference in fluid density between right and left branches.

Figure 2:
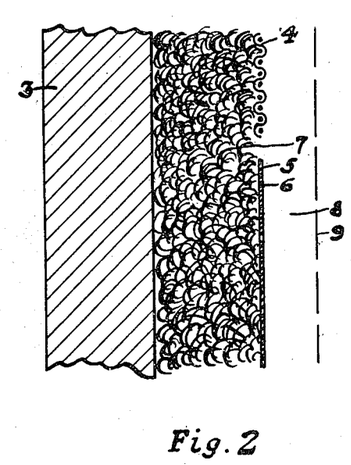
Fig. 2 shows type $Ba$, the drift velocity being zero and the normal fluid being utilized in the insulation layer.

In Fig. 2, a wall 3 being insulated by a fluid layer subdivided by a material, shown fibrous in character, 7 retained either by a suitably supported wire screen 4 or a thin plate 5 pierced with numerous holes 6 so that the normal working fluid 8 being insulated from wall 3 may freely penetrate fibrous material 7, being subdivided thereby against radiation through, and convection currents in the fluid layer. 9 merely bounds the view.

Figure 3:
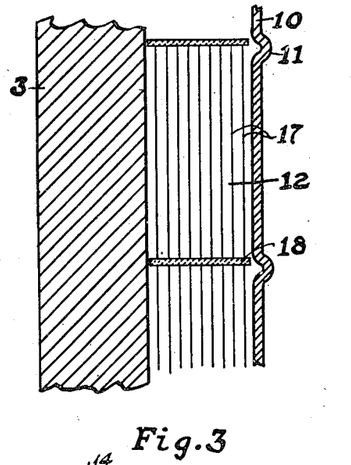
Fig. 3 shows type $Bb$, the drift velocity being zero, and the normal fluid being replaced by an insulating fluid isolated from said normal fluid.

In Fig. 3, a wall 3 being insulated by fluid layer between 3 and impermeable partition 10 from the normal fluid to the right of 10, the fluid layer being subdivided against radiation through, and convection currents therein by a set of parallel plates 17 forming, between adjacent pairs, fluid or convection cells 12, plane solids 18 of low conductivity, preferably, serving to subdivide the insulation vertically, while conventional corrugations 11 in 10 permit of thermal expansion with a minimum of distortion.

Figure 4:
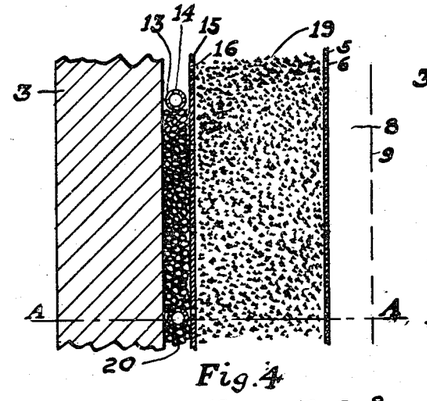
Figure 5:
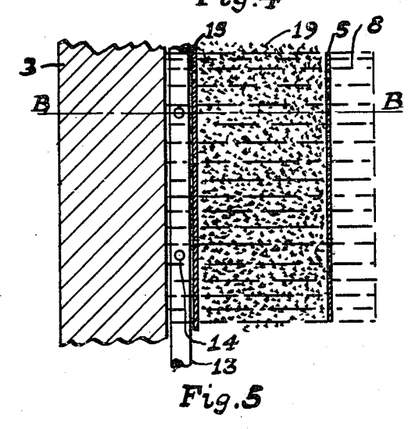
Fig. 5 shows type $Aa$, the drifting fluid flowing into the normal fluid, B—B showing the location of Fig. 4, a cross-section perpendicular to Fig. 5, and A—A the location thereon of Fig. 5.

In Fig. 4, a wall 3 being insulated by a subdivided fluid layer between thin plates 5 and 15 perforated with numerous holes 6 and 16, the subdividing material as shown consisting of granular material 19, through which fluid from pipes 13 and holes therein 14 and the distributing layer of coarse granular material of low resistance 20 passes freely into normal working fluid 8. Similarly in Fig. 5, in which the fluid is shown as a liquid. As before, 9 merely limits the view.

Figure 6:
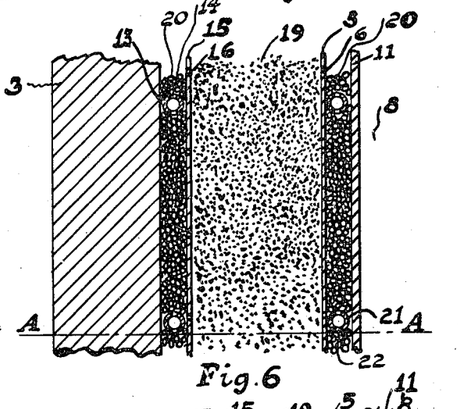
Figure 7:
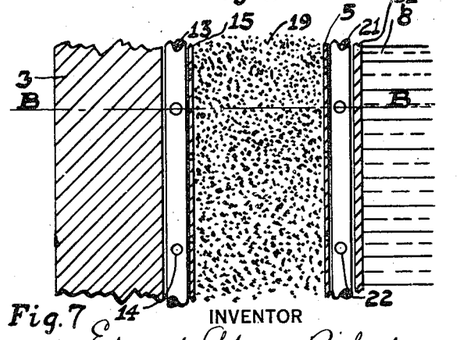
Fig. 7 shows type $Ab$, the drifting fluid being other than the normal fluid and isolated from said normal fluid, B—B showing the location of perpendicular cross-section at Fig. 6, and A—A thereon the location thereon of Fig. 7.

In Fig. 6, a wall 3 being insulated by a subdivided fluid layer as in Fig. 4, but differing therefrom through the isolation of the insulating fluid from the working fluid by impermeable partition 11, and coarse granular material 20 between permeable partition 5 and impermeable partition 11 for collecting the drifting fluid and delivering it through holes 22 into the pipes 21, perforated thereby, for removal, possible heat recovery, and recirculation to pipes 13.

Figures 8, 9, 10, 11, 12:
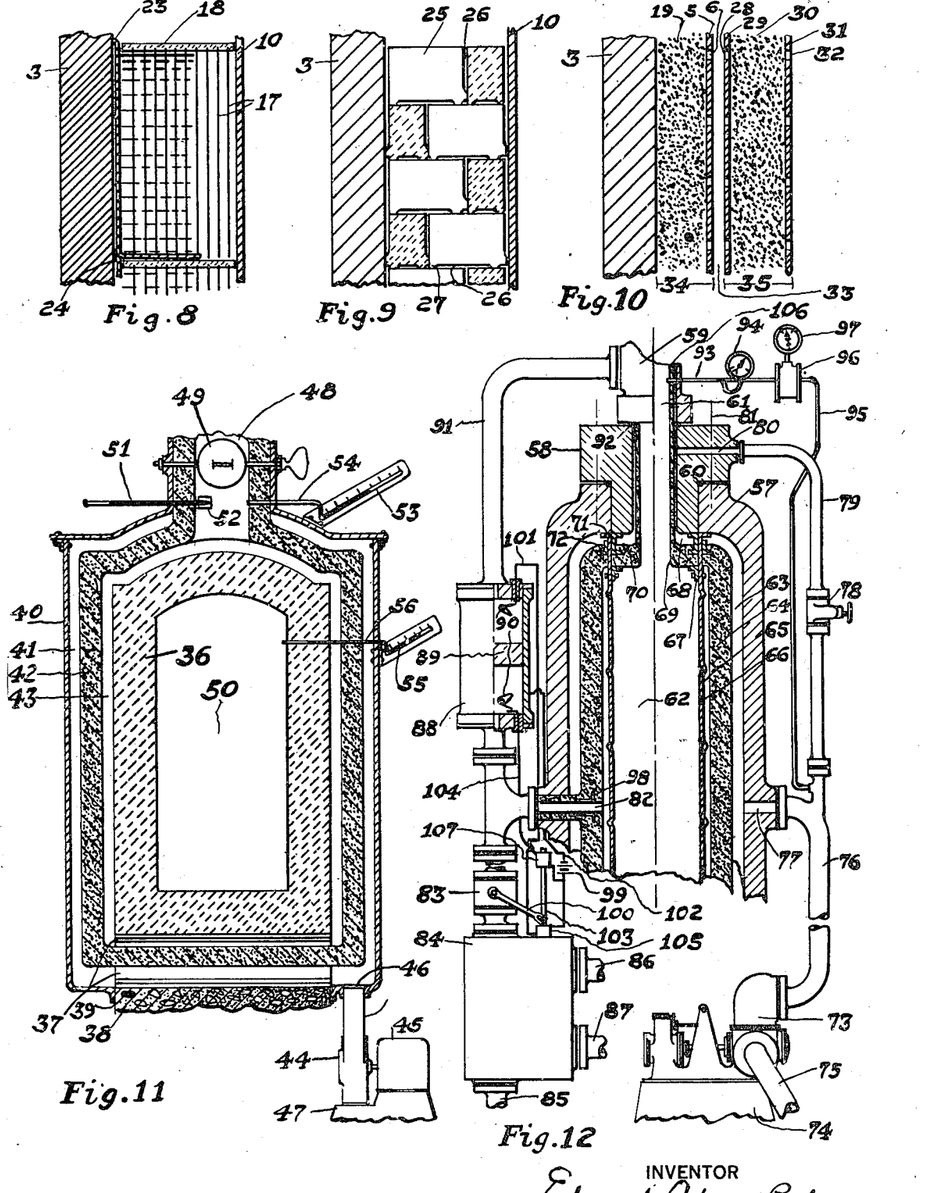

In Fig. 8 type Bb insulation is shown in which the isolated fluid is in the liquid state towards wall 3 and of high density, but in the vapor state towards impermeable partition 10 and of low density, the subdividing body consisting of plates 17 supported from the preferably low conductive body 18 which serves in part to subdivide the fluid vertically into insulation cells. Convection between cells is reduced, as shown, by angular troughs 23 fitting the wall snugly at the upper end of the cell thereby insulated and provided with a horizontal leg projecting through the liquid region and preferably well into the vapor region, plates 17 preferably resting snugly thereon or being fastened thereto so as to limit convection between the fluid cells formed between the adjacent pairs of parallel plates 17. 24 illustrates the upper end of a trough, similar to 23, serving the cell vertically below that shown. This is merely one form of such means for vertically subdividing the insulating layer.

In Fig. 9, wall 3 is insulated by a fluid layer isolated by impermeable wall 10 from the normal working fluid while being subdivided by blocks 25, formed of solids preferably of low heat conductivity, and separated by thin fluid spaces 26 whose thickness may be determined by projections 27 on blocks 25.

In Fig. 10, wall 3 is being insulated by a subdivided fluid region 34 from preheated fluid being introduced through channel 33 between fluid regions 34 and 35, 34 being subdivided, as shown, by granular material 19 retained by plate 5 perforated with numerous holes 6, while region 35 is subdivided by granular material 30 retained between plates 29 and 31 perforated with numerous small holes 28 and 32 respectively while the preheated fluid being introduced through 33 and insulated from wall 3 passes through insulating layer 35 in a direction substantially normal thereto into the normal fluid region.

In Fig. 11, 36 is the wall of furnace volume 50 of high temperature being insulated or isolated from its surroundings. Walls 36 are supported on steel beams 37 by foundation 38 and are surrounded excepting for 38 by casing 40 spaced from the walls and by a fluid region subdivided by body 42 spaced between 36, and 38 and 40, 40 and 42 forming therebetween a space 41, while 36 and 42 form therebetween space 43, the latter communicating, through insulated flue 48 past damper 49, with the exterior, the former space fed through pipe 46 by fan 44 driven by motor 45, fan and motor on foundation 47. The joint between 38 and 40 is sealed at 39. The fluid pressure in space 50 is measured by draft gage 55 communicating with 50 through pipe 56, while the fluid pressure in 48 is measured by draft gage 53 communicating with 48 through pipe 54 and the temperature is measured by thermometer 51 whose bulb in 48 is shielded at 52. It is to be understood that casing 40 may be divided into several sections by planes parallel to the paper and spaced axially of the furnace or flue, whereby the pressure in 43 and the flow therethrough may be kept in substantial balance with a pressure varying axially of 50 if such exacting adjustment proves necessary.

Operation is as follows: The furnace pressure is maintained at a predetermined value somewhat above atmospheric, preferably, at the axial position shown, and as read on draft gage 55. Fan 44 driven by motor 45 forces a stream of air into space 41, the pressure drop therein being so small as to be negligible. The air under pressure passes inwards substantially radially through subdividing layer 42, of substantially constant fluid resistance from point to point and large compared with the pressure drop in 41, into space 43. The latter space, like 41, offers negligible resistance to the air flow while conducting the air over 36 to exit passage 48. The pressure is so controlled, as measured at 53, as to substantially balance the pressure in 50, partly by closing or opening damper 49, partly by varying the fan speed, while at the same time adjusting operation so as to have a relatively high temperature shown at 51, but not so high as to lead to refractory overheating in wall 36 at chamber 50. Thereby heat trying to escape from 36 through 42 by radiation and convection is picked up in 42 by the air flowing through so that the temperature at 40 remains substantially that of the entering air, all heat lost from 36 passing out through 48 at relatively high temperature favorable to the recovery economically of the contained heat. Similarly for any other cell at any other axial position. Where walls 36 are substantially impermeable to air infiltration, it becomes unnecessary to balance pressures on the two sides of wall 36, but it is still desirable to limit ventilation by fan 44 to a small volume yielding high temperatures at 51.

In Fig. 12, pressure-sustaining wall 57 of a reaction chamber is closed by cover 58 made tight with gasket 60 and is fed through pipe 59 made tight to 58 with gasket 92, the pipe and opening through 58 being lined with a subdividing layer 106 spaced therefrom and forming fluid passage 61 into normal fluid containing reaction chamber space 62. A subdividing layer or envelope 64 spaced from 57 forms a passage therebetween 63, and within 64 and spaced therefrom is impermeable preferably metal wall 66 forming therebetween space 65. To the upper end of 66 a flange 67 is shown riveted, against which subdividing material 69, continuous with 106, makes a tight joint. Ring 70 attached to 58 and imbedded in 69 closes passage 68 between 58 and 69 and fits in 66, while ring 71 closes passage 63 and prevents leakage past 64. A pump 73 governed to deliver constant fluid mass against variable pressure is fed through suction 75 and is set on foundation 74, delivering fluid through pipe 76 and passage 77 in the reaction chamber wall to space 63, and also through valve 78 and pipe 79 and passage 80 in head 58 to space 68. The pressure in 68 is obtained from pipe 79 through pipe 95 at pressure-difference-balance 96 equipped with pressure-difference gage 97, the pressure to be differenced being that in 61 transmitted to 96 through pipe 93, the latter equipped with gage 94 for process purposes. This pressure-balancing and differencing system guides the supply of insulating fluid to space 68. 81 indicates the bolt circle for the bolts holding cover 58 to reaction chamber 57. Now passage 65 communicates through pipe 82 through chamber 57 with throttle valve 83 in communication with heat transfer chamber 84 from which cooled fluid may be discharged by pipe 85, being cooled by cooling medium introduced to 84 through 86 and removed therefrom through 87, and 82 is also in communication with balancing cylinder 88. 88 containing movable piston 89 which strikes limit switches 90 at either end of its travel, the opposite side of piston 89 and cylinder 88 being in communication, through pipe 91, and reaction chamber feed pipe 59, with fluid passage 61. An electric source such as a battery 99 is grounded to cylinder 88 through wire 102, feeding electric potential to switches 90 attached to 88. The upper switch contact is wired through wire 101 to lower solenoid 105, while the lower switch contact is wired through wire 104 to upper solenoid 107. Throttle lever 100 is actuated by the motion of rod 103 carrying armatures in the solenoids. Leakage through subdivided layer 64 past pipe 82 is restrained by collar 98 imbedded in 64 and attached to 82. Solenoids 105 and 107 are wired to the second battery terminal.

Operation is as follows: Working fluid is fed through passage 61 into reaction chamber 62 and is withdrawn therefrom by means not shown but of similar character. The fluid pressure in 62 is read on gage 94 and is maintained substantially constant, while pump 73 is operated at such mass delivery rate as may be required for insulation purposes, valve 78 being adjusted to show substantially zero pressure on gage 97, or at most a slightly higher pressure in 95 than in 93. It should be noted that pipe 95 should open into 79 above and not below the valve 78. The fluid flows from the pump through pipes 76 and 79 and valve 78 through passage 80 into space 68 and substantially uniformly through all points of subdivided layer 106 into the working fluid in 61, being carried away thereby. In this way, heat attempting to escape through 106 is recovered and returned to the working fluid as preheat in the entering insulating fluid. This system may prove satisfactory for pipes and reaction-chamber-cover passages.

The insulation of the principal parts of the reaction chamber may be carried out substantially automatically, a possible form of apparatus being as shown, its operation being as follows: Neglecting the flow through 78, pump 73 delivers a constant mass rate of insulating fluid through pipe 76, passage 77, space 63 of negligible fluid resistance, subdivided layer 64 of uniform fluid resistance high relative to that of the passages, space 65, pipe 82, throttle valve 83, heat exchanger 84 and discharge pipe 85 to waste, or to pump suction 75, while 82 is in free communication with the lower side of piston 89 in cylinder 88. The fluid pressure in 61 is in free communication through pipe 59 and pipe 91 with the upper side of piston 89 in cylinder 88. If the throttle valve 83 is too far closed, the pressure below the piston tends to exceed that above, and the piston 89 rises, closing switch 90. Thereupon a current from battery 99 flows through wire 102, cylinder 88, switch 90, wire 101, solenoid 103 and back to 99, whereby the solenoid actuates the armature therein and moves the rod 103 in such direction as to actuate lever 100 and increase the opening of throttle valve 83. The pressure in 61 causes fluid to flow through 59 and 91 into 88 driving piston 89 down until lower switch 90 is closed. Thereupon a current from battery 99 through wire 102, cylinder 88, switch 90, wire 104, solenoid 107 and back to 99 actuates 103 in the opposite direction and through lever 100 reduces the opening of valve 83. Thus by slightly raising and lowering the pressure in 82 by throttling the constant mass fluid flow, a substantial pressure balance between 62 and 65 is secured and maintained whereby the pressure in 62 is transferred through the fluid to 57 and the reaction chamber wall maintained at the temperature of the entering fluid, the heat taken up by said fluid being recovered in 84. Other balancing methods are contemplated.

Figure 13:
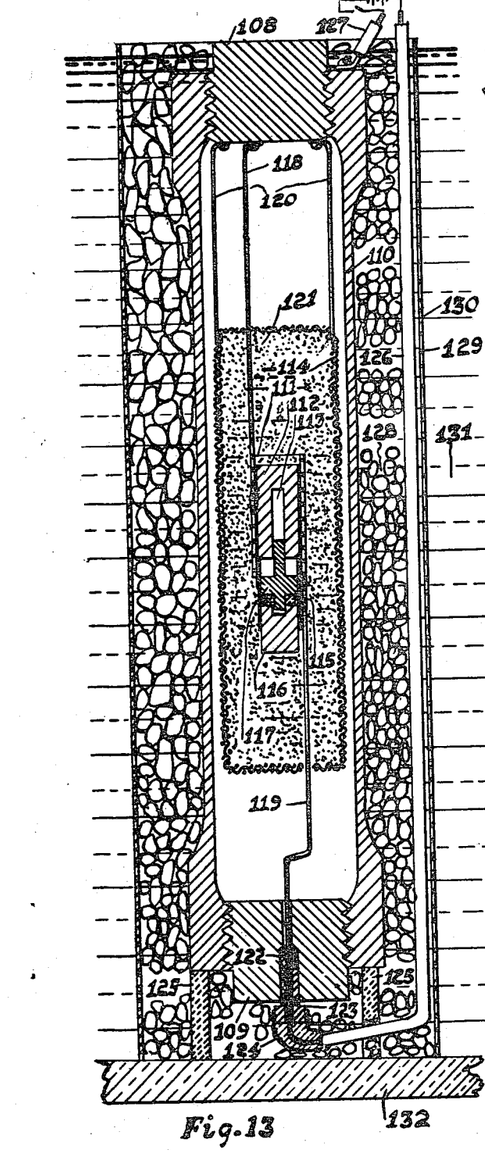
Fig. 13 shows a laboratory form of apparatus by means of which a fluid region at high temperature under high pressure may be secured and maintained, the pressure being generated by freezing a considerable portion of a fluid which expands on freezing, utilizing type Ba insulation in the fluid regions for securing a large temperature gradient between the high temperature region and the chamber walls.

In Fig. 13, a strong vessel 110 closed by plug 109 at the lower end, by plug 108 at the upper end, contains electric heating coil 111 within which is situated retort 112 with reaction chamber 113 therein into which pressure-increasing piston 115 working in an extension of 112 fits, snugness being secured by obturation packing 115 which is compressed by piston 116 which also fits in the 112 extension. Within a wire mesh enclosure 114 supported by hangers 120 from plug 108 is placed subdividing material, preferably granular, 121 packed about the retort and heater. The heater 111 is grounded through wire 118 to plug 108, while it is fed through wire 119 which passes through plug 109 and insulating gasket therein 122 which is compressed by gland nut 123 against the inner pressure. A battery and switch shown permit current to be fed through wire 127 to plug 108, and through wire 126 insulated in waterproof fashion and insulated at 124, to the heater. The apparatus is supported vertically on insulating ring 125 resting on vessel bottom 132. The whole is surrounded by a permeable cage 130 perforated by holes 129. The vessel is filled with a salt solution of frigorific character 131, and the space between 110 and 130 is packed with ice, and ice is continuously fed thereto. The interior of 110 is filled in a gas-free manner with liquid expanding on freezing.

Operation is, for example, as follows: Space 113 is filled with material to be treated, pistons 115, 116, 117 inserted, the retort placed in position within 111, the interior filled with water, and the plug 109 screwed in. Packing 122 is compressed about wire 119 by gland nut 123 and insulation 124 put in place. The apparatus is placed on 125, and the space between 110 and 130 filled with ice, salt solution being placed in the vessel. The contents is allowed to freeze solid, maintaining the ice as shown.

With the water contents of the apparatus solidified, the electric circuit through the heater is closed. A heating up of the contents of the retort takes place in such manner as to maintain equilibrium between the heat input, and the heat utilization in increasing the temperature of the contents and loss to the surroundings, this equilibrium tending to approach that in which the temperature is constant and the equilibrium is between input and loss to surroundings. For example, in the apparatus of the exact size shown, an input of about 50 watts, a temperature of frigorific mixture of −18 degrees F., and the attainment of constant temperature suffice to maintain the retort at about 1000 degrees F., the pressure on 116 about or of the order of 20,000 pounds per square inch, and the pressure on the material in the retort of the order of 150,000 pounds per square inch.

This is accomplished by restraining the gasified and the liquefied water from convection, and the thorough subdivision of this fluid region against radiation therethrough, so that a very large temperature drop occurs between 112 and 114, the balance of the water in the apparatus remaining solid, in spite of the high temperature at the retort, for the purpose of maintaining the high pressure on the retort. It is to be recalled that the water occurs in three states, that of ice, that of water, and that of gas, there being no vapor region possible at pressures above about 3600 pounds per square inch, the water being physically a gas at temperatures above about 706 degrees F., the critical temperature. The temperature of −18 degrees F. is required to remove 50 watts of heat energy while maintaining sufficient water solid.

In shutting down the apparatus where it is important to maintain the pressure, the heater circuit is opened, the supply of refrigeration is maintained until the retort has been cooled to a sufficient degree, as low as the freezing point or below if necessary, whereupon the apparatus or reaction chamber may be removed from the frigorific mixture and the water in the apparatus permitted to liquefy. The heater circuit wire 126 may then be removed, the insulation gasket retaining nut loosened, and the plug 109 removed.

Figure 14:
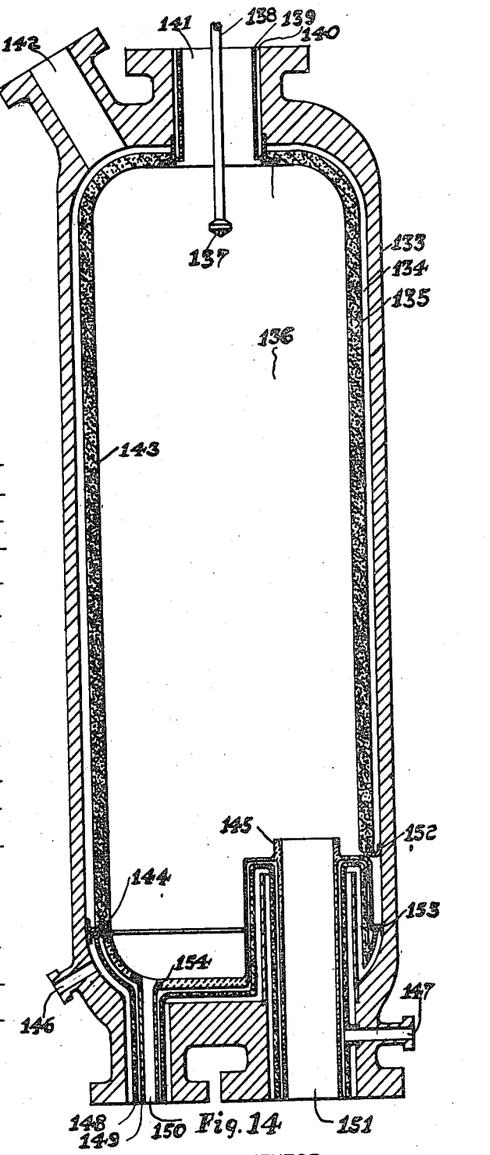
Fig. 14 illustrates a form of apparatus particularly adapted to heating the drifting fluid as a primary aim, utilizing a thin layer of type Aa insulation, the interior of the apparatus serving as a furnace liberating the required heat.

In Fig. 14, 133 is a pressure resisting vessel, 135 a radiation and convection subdividing layer permitting a large heat loss at zero fluid drift velocity, 134 a passage therebetween of negligible fluid resistance compared with that substantially uniform fluid resistance through 135, 136 the heater space, for example, in this case, a combustion chamber—137 is a fuel burner fed by pipe 138, 139 is a subdividing layer spaced from the nozzle of vessel 133 by space 140, and forming entrance 141 to space 136. Nozzle 142 of 135 opens into space 134. 143 is the inner surface of 135. 144 is a ring embedded in 135 for stopping 134 and leakage around 135, 145 a refractory nozzle, 146 a nozzle in 133 opening into the space between subdivided layer 148 and vessel 133, 155 a refractory hearth in which outlet pipe 149 is embedded forming hearth outlet 150. 147 is a nozzle in 133 communicating with the space between 148, and 149 and 154. 152 is a space 134 closure like 144, while 153 closes similarly the space between 133 and 148. 151 is the refractory lined outlet from combustion chamber 136.

Operated as a fluid heating device, operation is as follows: With nozzles 142, 146 and 147 closed, and outlet 151 throttled, air for combustion is introduced through 141 under pressure while fuel in proportion is introduced through 138 to burner 137 at a corresponding pressure, ignition of the fuel being secured by suitable means on starting up. When combustion is properly initiated in 136 at a low rate but under suitable pressure, air is introduced into space 139 at such rate as to maintain the nozzle cool, presuming preheated air is entering through 141. At the same time, air is also introduced through nozzle 146 and heated air is throttled at outlet 147 so that the temperature of 133 below the hearth may be kept at about that of the entering air while the pressure in 136 is being balanced without wasting heat through 147. The fluid to be heated is now introduced under pressure sufficient to produce the flow desired against the pressure in 136 and against the resistance of the subdivided layer 135, the outlet 150 being maintained closed until the hearth 154 is covered to a sufficient depth not exceeding the level of nozzle 145, whereupon the outlet may be opened to permit of fluid being withdrawn through 150 as rapidly as it is introduced through 142. Obviously if the resistance of 135 is uniform, while the fluid being introduced is of greater density than that of the fluid in 136, fluid will flow in more rapidly near 144 than near nozzle 142, the relative flow being governed by, and being substantially proportional to the fluid head, at the point of the surface of 135, which is being utilized in producing flow. In general, particularly for relatively high rates of fluid flow, the amount of preheat obtained inside of 135 will be relatively small, most of the heat being absorbed while the fluid is on surface 143.

Having described various forms my invention may take, certain modifications thereof deserve consideration. For example, though I have shown in Figures 4, 5, 6, and 7 pipes bedded in coarse granular material for distributing the fluid being introduced to the surface of 15 at a rate substantially equal at all points, in many cases it will be sufficient to introduce the fluid at one point of a space such as that between 3 and 15 in the figures above, this space being empty of granular material or other apparatus than the fluid being introduced, as, for example, in the cases of Figs. 11, 12, and 14. The important thing, in general, is that the rate of flow through every point of the subdivided layer be the same, however that be effected. When the fluid density on the two sides of said subdivided layer is nearly the same, or varies in nearly the same manner, vertically, clear spaces are sufficient for feeding fluid to all points of the subdivided layer, for it is then sufficient to have the pressure drop in the space negligible compared with the pressure drop through the subdivided layer. When the fluid density on the two sides of the subdivided layer is materially different, the rate of flow through the topmost portion of the subdivided layer may be much less than through the lowermost portion thereof or vice versa, not necessarily an undesirable feature, but in many cases undesirable. In such cases, it is necessary to divide the space for introducing the fluid to the subdividing layer, by horizontal partitions, into cells vertically, controlling the fluid fed to each cell so that each receives an equal share, and the reduced vertical distance available for exhibiting the effect of density differences minimizes such flow variations. In Fig. 11 I showed that vertical partitions might be necessary for dividing into cells when the pressure drop occurs in a horizontal direction, requiring sectional control of the entering fluid.

In other words, the important part of my invention is not the exact means adopted for securing a flow through the subdividing layer equal from point to point, but the flowing of fluid through a subdivided layer so as to pick up the heat trying to escape. Similarly in collecting fluids which have passed through the subdividing layer, as to the space between 5 and 11 in Figs. 6 and 7, or to space 43 in Fig. 11 or space 65 in Fig. 12, questions of density difference may arise and may be handled by horizontal or vertical partitioning as mentioned above, and a removal system may be used, as the coarse granular material and pipes, or the space may be empty excepting for the fluid passing.

In Fig. 11 an apparatus was shown adapted to substantially atmospheric pressures, fluid distribution being sufficiently uniform to warrant feeding at a measured rate at one point with the minimum of observation and control. In Fig. 12, an apparatus adapted to very high pressures and high temperatures, two forms of apparatus for controlling the flow of the insulating fluid are described, and for maintaining pressure balance between the contents of 62 and that of 65. The more nearly 66 approaches a membrane in character, the more important pressure balancing becomes, while the more nearly 65 can come to taking the pressure, the less important such balancing becomes, the total pressure remaining the same. In any such apparatus, a substantially constant process pressure, or a slow rate of variation thereof, simplifies the heat insulation, and is to be attained if at all practicable. Rapid variations may lead to heat loss through back flow of insulating fluid through the subdividing layer, or require excessive fluid flows through the insulating layer.

Neither form of apparatus shown in Fig. 12 for fluid supply and for pressure balancing is considered more than illustrative in character. In the case of supplying space 68, the principle involved was flow control through maintenance of a constant pressure drop between 61 and 68, at least approximately. A wide variety of forms of apparatus may be adopted utilizing this principle of control, the form shown being one by means of which such control could be attained. In the case of supplying space 63, the principle of a constant mass supply of fluid, irrespective of the fluid pressure, is utilized for maintaining the insulation effect, the balance of the apparatus serving merely to raise or lower the pressure of the fluid discharged from the insulation system so as to maintain substantial balance with the process pressure by means of small excursions alternately to one side and the other thereof. A wide variety of means for effecting the application of these principles will be devised by one skilled in the art. They may be manual or automatic in character; constant, intermittent, or oscillating in operation; mechanical, electrical, or perhaps other, in means utilized.

Although I have in general shown a subdivided layer of fluid resistance equal at all points, it may prove desirable, particularly in the case of a body of considerable extent varying in temperature from point to point, to vary the resistance, or more directly the rate of flow, from point to point, either according to the quantity of heat to be picked up, or for any other purpose. This may be done by means of thicker layers, or rather variations in the thickness of the subdivided layer, by subdivision into cells and the control of fluid quantities by cells, or by variations in the fineness of the material in the subdivided layer so as to vary the resistance and hence the flow under constant pressure.

Certain principles must now be considered which must be utilized by the one skilled in the art who desires to utilize my invention. I shall consider three, viz. the subdivision of the radiation loss, the reduction of the convection loss, and the "licking up" of heat by fluid drifting through the subdividing layer against the temperature gradient.

*Radiation subdivision.*—In the primitive fluid region which is to be subdivided, it is possible to determimne the heat flow, across the fluid layer to be subdivided by radiation, by usual means. It is also possible to determine, for the subdivided fluid region consisting of a heterogeneous body of solid and fluid, the loss by pure conduction corresponding to the temperatuare drop desired. The temperature drop to be utilized is that, corresponding to the temperature drop between wall and the insulated fluid, which is to be maintained by the insulation, not the primitive temperature drop across the layer actually subdivided. Calling the conductive loss $H_c$ British thermal units per square foot per hour, we can assign a desired value to be permitted to radiation through the subdivided layer, $H_r$, such that $H_r = AH_c$. If we utilize a series of parallel plates for subdividing the radiation, we can start at the temperature to be insulated against and determine the temperature drop, to the next plate, corresponding to the material of the plates and the heat flow $H_r$, and so on until the temperature has been reduced to that of the wall, obtaining thereby a number of plates approximately equal in number to $H_R$, the initial radiation, divided by $H_r$. If a granular material is used, the number of layers of grains will be greater, probably at least twice as great, though that will depend on the emissivity of the particles and the polish of their surfaces.

Where the temperature drop is great, subdivision against radiation may determine the thickness of the fluid region to be subdivided. As before suggested, however, radiation subdivision may be carried on independently of convection subdivision by utilizing a fluid opaque to radiation, as a fluid whose molecules absorb highly such as liquid metals, or fluids in which a solid suspension or dispersion of fine particles produces effective opacity. In such cases, the thickness of the subdivided region is determined by the temperature drop, the allowable heat loss, and the conductivity of the subdivided region including the subdividing material added.

My invention is distinguished by the subdivision of the fluid normal to the vessel, or a fluid isolated therefrom and introduced for thermal insulation, to reduce radiation so that A is of the order of, or small compared with 1. This is one limitation of importance in distinguishing class B insulation from that of others.

*Convection loss.*—Referring to Fig. 1, plate 1 is at higher temperature, plate 2 at lower temperature. With no convection, the temperature of the rising current, or fluid in the region so marked, would have a mean value approximately ¼ the temperature drop between 1 and 2 less than the temperature at 1, while the temperature in the region of the descending current would have a value approximately ¼ the temperature drop between 1 and 2 greater than the temperature at 2. We could set up mathematically accurate equations for the flow both by conduction and convection and calculate the type of both fluid and heat flows, but it is my desire to show the nature of the problem by simpler approximate methods.

Knowing the temperature of both the rising and the descending streams of fluid, we may assume, as the limiting case, that the mean temperature is constant throughout the height, and so may calculate the difference in pressure per unit of L, or height, between the two columns, available for overcoming the resistance of a fluid stream of thickness $a/2$ flowing in a channel two units long. The equivalent pipe diameter, D, in the usual equations for resistance in laminar flow, is twice the laminar thickness, or $a$. The velocity of flow so calculated will obviously be greater than that which can actually occur. Nevertheless, when convection has been restrained, the effect of the flow occurring will be sufficiently small so as to approximately maintain the temperatures assumed.

If temperatures of the two columns of fluid are as given, then the heat transferred may be calculated, approximately, as the heat necessary to change that weight of fluid flowing per hour in a channel one foot wide and $a/2$ inches thick through a temperature range one half the difference in temperature between 1 and 2.

As we desire to limit the heat flow by convection to $BH_c$, where B is of the order of or preferably small compared with 1, we can determine D, and hence $a$, its equal, the spacing of the parallel plates, for any pair of parallel plates. We can thus obtain a value which can be exceeded but slightly without exceeding the heat loss allowed for convection.

When dealing with a granular mass, convection occurs through the whole thickness of the subdivided layer, and the temperature drop is the whole temperature drop. The resistance equation must utilize the resistances known to apply in granular masses, and the fineness dimension obtained will have the character of particle size.

It should be noted that the fineness dimension for spacing the subdivided body in limiting convection does not apply to the spacing in the direction of flow of the drifting fluid. The spacing may be more, but probably will be less to secure proper resistance to the drift flow of fluid.

In this connection, it should be noted that small perforations to permit of the drift flow are required at frequent intervals in parallel plates or other normally continuous solids for subdividing against radiation. The number of such perforations or their size or other characteristics must be determined primarily by the resistance they are to offer to the fluid flow, and this resistance will normally be relatively large.

My invention is further distinguished by the limitation on the fineness dimension, or spacing of the subdividing material for limiting convection, so that B is of the order of or less than 1, the fineness dimension, as defined, being of the nature of a spacing, but measuring either a spacing or particle size, according to the type of resistance equation utilized.

In dealing with granular material, where it is not practicable to change the size of particles with direction, whichever gives the smaller particle, whether convection restraint or resistance to fluid drift, determines the particle size to be used. If fluid drift determines, then convective heat loss will be made negligible, or nearly so.

A further limitation must be applied to the fineness dimension as regards convection. The spacing must not yield turbulent flow in the fluid spaces, as such flow is contrary to our assumptions and materially increases the heat flow by convection. Turbulence might be permissible in certain cases, but as a general rule, only laminar flow should be allowed.

It will be realized that if the fineness dimension is determined for vertical passages, in which the convective force is greatest, such spacing will be more than satisfactory on any sloping passage.

Without carrying out the various steps of the calculation, but proceeding according to the assumptions made, we may calculate $D_h$, the fineness dimension for parallel plates, and also $D_1$, the fineness dimension for laminar flow in the same case, in inches, and obtain thereby the following equations:

$$D_h = .50(B)^{.25}(kz/(Ced^2))^{.25}(T_k - T_{kl})^{-.25}$$
$$D_L = 1.43(z^2/ed^2)^{.33}(T_k - T_{kl})^{-.33}$$

In which, B is a fraction (of $H_c$) as previously defined, of the dimensions of a number; $d$ is the mean density, in pounds per cube foot, of the fluid; $e$ is the fractional change of fluid volume at the mean temperature per degree F.; $z$ is the mean fluid viscosity, in centipoise, or, in other words, relative to water at 68 degrees F.; C, a number, the mean specific heat of the fluid; $k$ the mean fluid conductivity in British thermal units per hour per square foot per foot per degree F., and $T_k$ and $T_{kl}$ the temperatures at the $k$th and ($k$ plus $l$)th plates.

These values for parallel plates will, in general, be considerably larger than the allowable particle diameter of granular material. It is reasonable to use values of the order of 10% of $D_h$ for granular material, for estimating purposes.

In carrying out the calculations for granular material, or even for the space between a pair of parallel plates when the temperature drop is large, it will be necessary to use an approximate method of summing up weights, flows, and the like, rather than depending on mean values of fluid quantities for wide ranges of condition and, even, of state.

These equations apply to fluids of any sort, and exhibit fairly well the effect of fluid properties on the fineness dimension.

*Heat pick-up.*—At zero drift with a given temperature drop across the subdivided fluid layer, a certain definite quantity of heat flows out across each square foot of area. To pick up this heat while being heated through the given temperature drop, a certain definite minimum quantity of fluid must flow inwards against the temperature drop. For example, suppose the temperature drop is 100 degrees F. and the heat flow is 10,000 B. t. u. per square foot per hour. This quantity of heat will heat approximately 100 pounds of water through 100 degrees F. A column of water 1 foot square and weighing 100 pounds is about 1.6 feet high, hence the water must have a velocity, as it approches the subdividing layer, of about 1.6 feet per hour, or 0.34 inch per minute, or .0057 inch per second. Such a flow of heat would normally apply only to a liquid heater, and not to a layer primarily for insulation.

When dealing with the more moderate heat loss of, say, 600 heat units per hour, only 6 pounds of water need be heated, or the velocity of approach is slightly less than 0.10 foot per hour. In the case of air, a velocity of the order of 330 feet per hour or 5.5 feet per minute would suffice, a mere zephyr. This will indicate the enormous effectiveness obtainable with a drift type of insulating layer, for the outside surface of the layer is at, or within a very few degrees, of the temperature of the entering air, while the temperature of the air at the inside surface of the insulation is that of the temperature being insulated. The whole of the heat flowing out has been regeneratively recovered in preheating the insulating fluid drift. Complete thermal isolation is possible, for no heat is rejected outside of the apparatus through surfaces. If heat gets out, it must be conveyed out in a fluid and may then deliver its heat in a heat exchange apparatus in a form useful for process purposes.

It will be obvious that a highly conductive type of subdividing layer may be used, such as metal, and the subdividing layer becomes a counterflow heat exchange apparatus. Where relatively important amounts of fluid are to be preheated, such insulation may prove acceptable.

If less quantities of fluid are used, some heat will escape in normal fashion; if more is used, fluid cooler than the contents will reach the inside of the insulating layer. A slightly greater flow than I have calculated will probably be required in any case to keep the outside at the temperature of the entering fluid. Obviously very thin subdivided layers which would lead to large heat loss without drift type insulation can be used effectively when the fluid must be heated up in any case, as the fluid required in the process, or a portion thereof.

Certain other alternatives require mention.

In Fig. 12, type Aa instead of Ab insulation of 57 could have been used, making suitable changes in the apparatus. Type Ab was shown to illustrate the use of pressure balancing, a thing unnecessary with Aa insulation. In such case, pump 73 delivering a constant volume rate of fluid would suffice, or more accurately, a constant weight rate of fluid, particularly when dealing with gases. Of course it is not always practicable to use a component of the process fluid for insulating purposes, particularly when such fluids are all corrosive, or unduly viscous, or subject to decomposition, or the like.

In Fig. 13, it will be obvious that any fluid which expands on freezing may be used in place of water, though fluids of low conductivity in both the fluid and solid state are to be preferred. Also, any other mechanical construction, mode of heating, or the like may be used, or any suitable arrangement of subdividing material. My invention consists in utilizing the freezing of the fluid, or a considerable portion thereof, for generating and maintaining pressure, and the establishment through heat flow of a large temperature gradient for maintaining the temperature. Also, any method of taking the heat away from the outside surface of 110 may be used, the only requirements being that the quantity and the temperature be suited to removing the heat liberated while keeping a considerable quantity of fluid frozen.

In Fig. 14, any suitable method of liberating heat is acceptable, although high pressure combustion is shown. Where vapor loss from the fluid being heated is large, type Ab instead of Aa insulation should be used, and suitable pressure balancing means provided. One example would be electrical heating with 136 filled with liquid to support the isolating wall, sufficient pressure being maintained to compress said fluid.

If a liquid is used for the heat transfer substance, obviously its volume will vary little with pressure, hence the enclosing membrane isolating the fluid being heated from the heat transfer fluid inside the membrane will be subject to negligible strains so long as pressure balance is maintained between said fluid being heated and the heater fluid, in fact in the case of a liquid heater fluid, only a slight pressure on the membrane is required. However, even at very high pressures on the fluid being heated, the compression of the heater fluid will be small or even negligible, and the stresses in the membrane will be limited to the interfacial compression in a substantial manner. If the heater fluid is not a liquid but a fluid subject to greater volume changes with changes in either temperature or pressure, pressure balancing becomes increasingly important.

It will be obvious, also, in Fig. 14 that the hot gases of combustion may be utilized in an auxiliary heat exchanger for preheating the fluid being heated in part, and it will be reasonably obvious that the method of Fig. 10 may be utilized for conserving heat, the preheated fluid being introduced to layer 35 through channel 33. It will also be obvious that a portion of the fluid only need be preheated by the exhaust gases and introduced through 33, the balance being introduced through Aa type insulation substituted for the Ba insulation of layer 34, thereby maintaining wall 3 "cold" (at the temperature of the entering fluid without preheat) and conserving practically all of the useful heat and permitting use of ordinary structural materials, rather than heat resisting materials, for wall 3.

Although the use of liquid metals for self-insulation has not been specifically considered, it will be obvious that many liquid metals near their freezing point may be held or subdivided by available solid materials and that the flow of such liquid metals may be guided by such materials toward a heat source which may raise the liquid metal above temperatures at which such solid materials may restrain them, whereby the liquid metal at high temperature, backed up by the liquid metal under control at low temperature, may be self-insulated while being caused to flow and while being heated. It is also obvious that a high temperature liquid metal being insulated as above may be protected from heat loss through the use of a second, presumably isolated, fluid insulating layer between the self-insulating liquid metal and the vessel wall, whereby the metal wall may be kept cool or even cold although containing a very high temperature process. The second fluid may be of any acceptable character and the heat recovered thereby may be usefully recovered in the process or otherwise, provided A type insulation is used, or the loss reduced to a minimum if a B type insulation is used. Liquid metals such as mercury, for example, of low or relatively low melting point, may be most valuable in obviating the need of subdivision against radiation from high temperature processes through the natural opacity of such fluids.

It will be apparent that a wide variety of substitutions, combinations, and the like may be used or devised without departing from the basic type of invention which I have disclosed.

When subdividing a fluid with a solid body, the resultant layer of fluid and solid will have a different conductivity from either solid or fluid. When thin, substantially parallel plates are used, the layer will have a conductivity very nearly that of the fluid. But when a body such as a granular solid is used, the conductivity may vary through relatively wide limits between that of a pure fluid and that of a solid. Gases range from, say, 0.0026 to 0.094, non-metallic liquids from, say, 0.063 to 0.14, a metallic liquid such as mercury, for example, about 4.83, non-metallic solids say from .094 to 7.3, and metals from 4.7 to 168, all in B. t. u. per square foot per foot per hour per degree F. Obviously the relatively high conductivity of a solid may materially increase the conductivity of the subdivided layer over that of the pure fluid, or conversely the substitution of a liquid for a gas may materially raise the apparent conductivity of a subdivided solid. The poor contacts of granular material insure a relatively high degree of thermal insulation in either a vacuum or a gas, but the substitution of a fluid of materially higher conductivity so improves the contact that the subdivided solid may approach the high conductivity of undivided solid material. Hence it is important to choose suitable combinations of solid and fluid, preferably a gas, when space is at a premium or the heat available for regenerative heating is limited. Sandstone, for example, is a solid of relatively high conductivity; sand in air a fairly effective insulator, but sand in water, or wet sand, is rated as a poor insulator due to the high conductivity of the sand grains and the material increase in effectiveness of heat transfer across contacts through the substitution of a fluid nearly 20 times as conductive as air.

Obviously dense packing and the use of grains differing in size will reduce fluid heat paths and increase the solid flow, hence it is preferable to use a granular material whose grains are substantially spherical, or approach the spherical form, and have the particle size substantially uniform. Also, solids and fluids of low conductivity should both be used if practicable, but if not, then at least a solid of low conductivity should be utilized.

It should be remembered in dealing with high pressures and temperatures that the conductivities of gases and liquids tend to approach each other. Gaseous conductivity increases with temperature, liquid tends to fall; pressure in general increases the conductivity, but the effect is small in the case of liquids.

Others have utilized subdivided liquids for insulation, but it is to be particularly noted that such things as salts and hydroxides in the liquid state are in general transparent. No one has heretofore recognized the importance of opacity as applied to insulating purposes.

It is to be particularly noted that my methods of fluid heating in which heat is not passed through a metal wall, or else is passed through a heat resisting metal wall at low interfacial stresses, permit the introduction of heat into high temperature, high pressure processes in a particularly practicable and economical manner with the minimum consumption of heat resisting materials, structural strength being attained with ordinary materials at substantially ordinary temperatures. For example, a reaction chamber at 900° F. may require 4 inches of metal, but if the pressure resisting wall is below 750° F., say even at atmospheric temperature, as little as 2 inches may suffice.

*Design procedure.*—In applying my invention, first determine an allowable heat flow across the region to be subdivided, consistent with the insulation desired, which heat flow may be considered the "allowable insulation loss". Such considerations as cost of heat loss versus cost of insulation, space available, or others will determine this value. This loss is made up of three parts, namely, that by pure conduction through the aggregate of fluid and subdivided solid amounting to $H_c$, that transmitted by radiation through the region, normally a fraction of $H_c$ amounting to $AH_c$, and that transferred by fluid convection through the region, also normally a fraction of $H_c$ amounting to $BH_c$. Hence the total heat loss is equal to or less than $H_c$ plus $AH_c$ plus $BH_c$, the quantities involved not being fully independent of each other.

As it is usually possible to make both A and B small or negligible compared with 1, the lowest heat loss from these three sources for a given thickness of aggregate composed of subdivided solid and fluid is only somewhat greater than $H_c$.

To make A of the order of or less than 1, assume $A=1$ and determine the number of partition equivalents required to limit the radiation loss to $H_c$. See "Radiation subdivision." In general, this number is related to the number of parallel plates required. Knowing the heat emission and absorption coefficients of the submerged plates and the unit heat flow, $H_c$, we may start at the high temperature and determine in succession the temperature of each succeeding parallel plate until we arrive at a plate whose temperature is that of the low temperature desired. This determines a number of plates which we may call N-partitions, or, for the layer of other material of equivalent effect, N partition equivalents. As A is approximately inversely proportional to the number of partition equivalents, we will normally increase the effective number of partitions over N to make A small or negligible compared to 1, subject only to practical limitations.

To make B equal to 1, see "Convection loss." With B equal to 1, a value of the parallel plate spacing, $D_h$, may be calculated. As we desire laminar rather than turbulent flow in the region to limit convection, this distance $D_h$ should be less than the laminar flow limiting dimension $D_L$ determinable by the second formula given. If granular or fibrous materials are used, a fiber or particle size, $D_p$, rather than the spacing will serve to limit convection. As these values may be represented in general by $D_N$, we may use a value of $D_N$ say half as great and the heat loss is negligible, since B varies with $D_N^4$. If $D_N$ were doubled, the loss would become nearly 16 times $H_c$. Convection is limited by limiting the Structural fineness, $D_N$.

Convection is limited by passages parallel to the faces of the subdivided layer. In limiting the rate of flow of the drifting fluid through control of the resistance of the subdivided layer, the dimension and number of the passages normal to the faces of the layer will be of importance, and we may refer to this pressure-drop fineness by a characteristic dimension $D_d$. In the case of granular material, $D_d$ rather than $D_N$ may govern.

When the primary aim of the insulation is regenerative or recuperative fluid heating, the values of $H_c$ may be much larger, but it is still necessary to limit both radiation and convection to insure recovery of the heat by the drifting fluid. The $D_d$ dimension may be most important in this case, as uniform flow values over the whole subdivided region may be most important.

Certain terms will now be noted and defined:

*Fluid.*—Any liquid, vaporous or gaseous substance, whether simple, compound or a mixture, whether pure or carrying liquid or solid substance in suspension or dispersion.

*Opaque fluid.*—A fluid opaque from the character of its molecules or a portion thereof, or rendered opaque through the presence of solid or liquid substance carried in suspension or dispersion therein and transported by the fluid while in motion.

*Vessel.*—A fluid-containing or conducting structure or apparatus whether the fluid, or the solids immersed therein, be the important feature of the structure or apparatus. Reaction chambers, pipes, and buildings are a few examples to suggest the wide range to be covered.

*Subdivided solid body.*—A solid body divided into plates, sheets, fibers, particles, blocks or grains, or a porous or cellular solid, substantial fluid penetration into the voids or the cell spaces, or through these, being permitted, the subdivided solid serving either to reduce convection in the fluid being subdivided, or to reduce convection and also reduce the flow of heat as radiation by interposing a series of heat absorptions and reemissions in the path of said radiation. The important feature is the ability to reduce convection and radiation, irrespective of the exact means of subdivision.

*Heat flow vector.*—At zero drift velocity in a subdivided fluid insulating region, the vector representing in magnitude and direction the mean heat flow through a small area in the region which area is of the order of but large compared with the Structural fineness of the subdividing body. In other words a mean heat flow vector at any point.

*Fluid flow vector.*—In a subdivided fluid insulating region, the vector representing in magnitude and direction the mean fluid flow through a small area in the region which area is of the order of but large relative to the Structural fineness of the subdividing body so that tortuous flow through channels, or between holes or perforations in plates, may be averaged out in the mean, both as to quantity and direction.

*Maintaining the volume.*—A process of maintaining the shape and volume of an isolated insulating fluid region so that such shape and volume changes as may occur will be limited to structural strains in walls or isolating partition corresponding to stresses not exceeding allowable working stresses for the materials. The partition may be entirely self-supporting against contained pressure, may be partially supported by pressure maintained on the isolated fluid region, or may be supported by substantial fluid pressure balance between the faces of the isolating wall, or by a structure of low conductivity in the region transferring the load to the pressure resisting wall. In general the process contemplates at least a measure of support to the isolating wall by the isolated fluid region itself.

*Large component.*—If vector is V, component is $V_c$, and angle between V and $V_c$ is $\theta$, $\cos \theta$ is not less than 0.10 and preferably is not less than 0.90.

*Isolated region.*—A fluid region fully cut off by a partition, wall, or membrane from another fluid region, at least so far as the vessel in question is concerned. It is possible that fluid from the isolated region may be conveyed into the vessel contents as through a pipe between the isolating region and the contents, but such flow must be subject to control. In general, isolation will be complete as indicated and there will be no transfer of such insulating fluid to or into the working fluid although the contained heat may be regeneratively transferred.

*Thermal isolation.*—The enclosing of a body to be insulated within an insulating envelope across whose surface the flow of heat to the surroundings is substantially zero, but such isolation does not forbid the removal of heated substances or cold substances through one or more pipes piercing the envelope, nor does it prohibit the introduction of hot or cold substances to the isolated body through one or more pipes piercing the envelope. However, complete isolation would include regenerative transfer of heat in substances leaving through pipes in the envelope to substances entering through pipes in the envelope inside of the envelope so that only excess process heat might be rejected through the envelope.

Having described my invention, I claim broadly those features relating to the utilization of a fluid drift for thermal insulation or isolation, as such is quite new in the art, but I limit my claims at zero drift velocity to such features as I believe to be new or improvements.

I claim:

1. In a vessel with walls insulated at least in part, the parts comprising, the vessel walls, at least one section of impermeable wall substantially paralleling at least a portion of the wall being insulated and spaced inwardly therefrom, a partition means between the vessel walls and the impermeable wall bounding said insulating section, a subdivided permeable wall-like body of heat-insulating material between the vessel walls and the impermeable wall and spaced from both and bounded all around by the partition means, means for supplying permeating fluid over the cooler surface of said wall-like body, means for removing fluid permeating through said wall-like body from over the warmer surface thereof, means for introducing contents into the insulated vessel and for removing it therefrom, and means for balancing the pressures on the two sides of the impermeable wall to the extent necessary to supply such structural support thereto as may be required.

2. The method of increasing the heat insulating qualities of a substantially uniformly permeable wall of heat-insulating material which comprises flowing a cooling fluid to the cold side of said wall under such pressure that a flow of said fluid through said wall is maintained over a substantial area thereof in sufficient quantities to materially reduce the transfer of heat therethrough but insufficient to materially cool the hot side thereof.

3. The method of increasing the heat insulating qualities of a substantially uniformly permeable wall of heat-insulating material which comprises flowing a cooling gas to the cold side of said wall under such pressure that a flow of said gas through said wall is maintained over a substantial area thereof in sufficient quantities to materially reduce the transfer of heat therethrough but insufficient to materially cool the hot side thereof.

4. The method of increasing the heat insulating qualities of a substantially uniformly permeable wall of heat-insulating material which comprises flowing a cooling liquid to the cold side of said wall under such pressure that a flow of said liquid through said wall is maintained over a substantial area thereof in sufficient quantities to materially reduce the transfer of heat therethrough but insufficient to materially cool the hot side thereof.

5. The method of increasing the heat insulating qualities of a substantially uniformly permeable wall of heat-insulating material which comprises flowing a cooling fluid to the cold side of said wall under such pressure that a flow of said fluid through said wall is maintained over a substantial area thereof in sufficient quantities to materially reduce the transfer of heat therethrough but insufficient to materially cool the hot side thereof, removing the fluid leaving the hot side of said wall, and recovering the heat contained in said fluid.

6. In a vessel with walls insulated at least in part, the parts comprising, the vessel walls, at least one section of impermeable wall substantially paralleling at least a portion of the wall being insulated and spaced inwardly therefrom, a partition means between the vessel walls and the impermeable wall bounding said insulating section, a subdivided permeable wall-like body of heat-insulating material between the vessel walls and the impermeable wall and spaced from both and bounded all around by the partition means, means for supplying permeating fluid over the cooler surface of said wall-like body at a controlled rate, means for removing fluid permeating through said wall-like body from over the warmer surface thereof, means for introducing contents into the insulated vessel and for removing it therefrom, and means for balancing the pressures on the two sides of the impermeable wall to the extent necessary to supply such structural support thereto as may be required.

EDWARD ADAMS RICHARDSON.